US005435822A

United States Patent [19]

Blouin

[11] Patent Number: 5,435,822

[45] Date of Patent: Jul. 25, 1995

[54] SPRAY DRIED WATER DISPERSIBLE FERTILIZER

[75] Inventor: John J. Blouin, Catonsville, Md.

[73] Assignee: W. R. Grace & Co.-Conn., New York, N.Y.

[21] Appl. No.: 198,682

[22] Filed: Feb. 18, 1994

Related U.S. Application Data

[63] Continuation of Ser. No. 862,870, Apr. 3, 1992, abandoned, which is a continuation-in-part of Ser. No. 433,647, Nov. 8, 1989, abandoned.

[51] Int. Cl.[6] .......................... C05B 19/00; C05D 3/02; C05D 11/00

[52] U.S. Cl. .......................................... 71/33; 71/63; 71/64.03; 71/64.05; 71/64.1; 71/64.13; 23/313 R; 34/372

[58] Field of Search ................. 71/64.02, 64.03, 64.05, 71/64.13, 64.1, 33, 63; 23/313 R; 34/28

[56] References Cited

U.S. PATENT DOCUMENTS

| | | | |
|---|---|---|---|
| 3,712,879 | 1/1973 | Strickrodt | 71/28 X |
| 4,568,417 | 2/1986 | Agarwol | 159/404 |
| 4,604,126 | 8/1986 | Moraillon | 71/34 |

*Primary Examiner*—Ferris Lander

*Attorney, Agent, or Firm*—Beverly K. Johnson; Bharat C. Gandhi

[57] ABSTRACT

A spray-dried foliar fertilizer for enhancing plant nutrition and health, prepared by spray drying nutrient compounds. The foliar fertilizer is amorphous, free-flowing and water dispersible and may be applied directly to the plant foliage by dusting or spraying.

14 Claims, No Drawings

SPRAY DRIED WATER DISPERSIBLE FERTILIZER

CROSS REFERENCE TO RELATED APPLICATIONS

This is a continuation of application Ser. No. 862,870, filed Apr. 3, 1992 and now abandoned, which is a continuation-in-part of U.S. Ser. No. 433,647, filed Nov. 8, 1989 and now abandoned.

FIELD OF THE INVENTION

This invention relates generally to the fertilization and nutrition of growing plants and trees and more specifically to a spray dried foliar fertilizer which provides a method for safely and effectively delivering nutrient materials directly to the foliage of growing plants or trees.

BACKGROUND OF THE INVENTION

Fertilizers and nutrients often cannot be applied to the foliage or leaf system of plants and trees, a delivery route termed foliar fertilization, because of damage that would occur to the plant or leaf. Various chemical compounds or by-products associated with conventional fertilizer compositions will often burn or otherwise damage a plant leaf upon direct contact.

Conventional fertilizers must be applied to the roots or growing medium, and typically are associated with admonitions to avoid application to or contact with the plant foliage. For example, calcium oxide and zinc dihydrate will burn plant leaves upon direct foliar application.

SUMMARY OF THE INVENTION

It is an object of this invention to provide a free-flowing foliar fertilizer that does not burn, shock or otherwise damage plant or tree leaves upon direct foliar application.

It is also an object of this invention to provide a method for preparing free-flowing foliar fertilizers.

It is another object of this invention to provide an economical delivery system for the application of nutrients to the foliage of growing plants and trees in both horticultural and agricultural settings for the enhancement of plant health and nutrition.

It is another object of this invention that the plant nutrient delivery system be easy to handle and apply and that they are easily stored and shipped.

It is a feature of the foliar fertilizers of this invention that they can be stored for extended periods in densely packed containers without caking or otherwise solidifying.

Another object of the invention is to provide to the agricultural and horticultural industries a spray dried foliar fertilizer material which comprises multiple nutrient components in a homogeneous composition.

A related object is to provide a foliar fertilizer composition which has been formulated so that it will not introduce chemical components or by-products injurious to the plant.

In accordance with the present invention there has been provided a foliar fertilizer which comprises amorphorus, free-flowing spray-dried nutrient compounds in a hydrated state that will not burn or otherwise damage plant leaves upon direct foliar application, prepared by dispersing nutrient compounds into an aqueous solvent to form a nutrient slurry, maintaining the nutrient slurry in a dispersed state and at a temperature in the range of from 70° F. to 190° F.; and spray drying the nutrient slurry at a temperature sufficient to maintain a volatiles content between 5 and 15 weight percent.

Also provided in accordance with the present invention is a method for preparing foliar fertilizers, comprising dispersing nutrient compounds in an aqueous solvent to form a nutrient slurry, maintaining the nutrient slurry in a dispersed state and at a temperature in the range of from 70° F. to 190° F., and spray drying the nutrient slurry at a temperature sufficient to maintain a volatiles content between 5 and 15 weight percent.

Also provided in accordance with the present invention is a method of delivering nutrients to plants or trees comprising directly applying to the leaves of the plants or trees a foliar fertilizer comprising amorphous, free-flowing spray-dried nutrient compounds prepared by dispersing nutrient compounds into an aqueous solvent to form a nutrient slurry, maintaining the nutrient slurry in a dispersed state and at a temperature in the range of from 70° F. to 190° F.; and spray drying the nutrient slurry at a temperature sufficient to maintain a volatiles content between 5 and 15 weight percent.

DETAILED DESCRIPTION OF THE INVENTION

The present invention is directed to novel foliar fertilizers which are useful for delivering nutrients to growing plants or trees. The foliar fertilizers of this invention are prepared by: (1) blending the desired nutrient components in an aqueous solvent to form a dispersed slurry, which may optionally include nucleating agents, maintaining the slurry under controlled conditions as hereinafter described, and (2) spray drying the slurry under critical temperature conditions. The resultant spray dried fertilizer composition containing plant nutrients in a hydrated state which is not injurious to plant leaves, may be applied directly to plant foliage as a dust or may be dispersed in an aqueous slurry prior to foliar application. The nutrients are thus taken into the plants through the leaf system thereby enhancing the nutrition and health of the plant.

As used herein, the terminology "nutrient compound" refers primarily to calcium, zinc and phosphorus compounds. Other nutrient compounds may optionally include sulfur, copper, manganese, and/or potassium. Phosphorus is typically added as phosphoric acid, for reasons of economy and stoichiometry. Calcium and zinc compounds are added in a form which is reactive with the phosphorus, and are generally in the form of a water soluble salt such as zinc sulfate and calcium hydroxide.

The specific proportion of nutrient compounds in the foliar fertilizer can be adjusted according to its intended application. For each fertilizer composition, the nutrient compounds are selected based upon the nutritional and health needs of the particular plants to which the fertilizer composition will be applied. Thus, the foliar fertilizer can be for general use, providing the basic nutritional needs of a large number of plant types; or alternatively, it can be highly specialized, providing particular nutrients or nutrient compositions for certain plant varieties or plants in particular phases of their growth cycle. For example, fruiting trees and flowering plants will have additional nutritional requirements which can be provided via the disclosed delivery system. The proportions of basic nutritional compounds also may be varied, depending on plant life cycle or the environmental conditions under which the fertilizer is to be used.

The nutrient compounds may be pre-mixed in the dry state, if desired. It may be desirable, as well, to grind or otherwise process some or all ingredients in order to break up agglomerates or large crystals which may be present. Alternatively, the nutrient compounds may be mixed together with an aqueous solvent, preferably all water, to form an aqueous nutrient slurry, using sufficient mixing or agitation to break up agglomerates and large crystals or other particles. It is considered important that the nutrient slurry be maintained in a homogenous dispersed state. This may be effected by mixing with a propeller, a high shear mixer or other agitator, or preferably may be recirculated through a centrifugal pump. Mixing or pumping is generally continued throughout the spray drying operation. It is desired to achieve a relatively stable slurry, i.e., a slurry having a settling time of about 4–5 minutes. A slurry of sufficient fluidity to be conveniently fed into the spray drier is used. Preferably, the maximum solids content is about 40.0 wt. %. The maximum acceptable particle size is not per se critical to the invention, and is generally a function of the size of the spray drier nozzle, that is, the ingredients must be of a size which can be fed through the nozzle. This also will vary with different types of nozzles.

It may be desired to include a nucleating agent in the nutrient slurry as a spray drying aid. The function of the nucleating aid is to provide an attachment site about which the nutrients of the slurry are attracted and held during spray drying to form an amorphous spray dried fertilizer material. This results in formation of small individual amorphous particles, yielding a homogenous product which can be uniformly and efficiently applied.

The nucleating agent must be porous. The bulk density of the nucleating agent preferably is 0.8 to 3.0 grams per cubic centimeter. The material must have a particle size which is large enough to settle in air (i.e., in the spray drying system) but small enough or of sufficient porosity to provide adequate surface area for nucleation and attachment of the nutrients. Preferably, the particles are less than 100 microns in diameter. The nucleating agent may be an inert particulate substance such as diatomaceous earth, activated carbon, silica, alumina, or silica-alumina, or a mixture thereof. In certain applications, the presence of a nutritive nucleating agent may be desired. The nucleating agent most conveniently may be added in the mixing step described above, but may be added before or after that step as convenient. For example, ground bran, chitin or other cellulose-based substances such as corn cobs, peanut hulls and the like, or a mixture thereof, may be used.

Dry nucleating agents may be added to the nutrient slurry. Alternatively, the agent may be slurried prior to addition, if desired. The nucleating agent and nutrients are thoroughly mixed to form a uniform homogenous mixture under ambient conditions. Typically, the nucleating agent is present as about 2.0 to about 10.0% of the slurry. On a dry weight basis, there may be about 0.2 to about 5.0 grams of nucleating agent per gram of total active solids (i.e., nutrient).

It is considered an important feature of this invention that the nutrient compounds be maintained in a state that will not burn, dehydrate, or otherwise damage the leaves on plants or trees to which they are applied. Accordingly, the nutrient compounds must be in a hydrated state which provides a neutral pH when dissolved in water. This is generally effected by maintaining the nutrient compounds in their fully hydrated state, i.e., the tetrahydrate forms. It has now been discovered that maintaining the nutrient slurry under controlled temperature conditions, between 70° F. and 190° F., preferably between 90° F. and 150° F. and most preferably at about 100° F., that the nutrient compounds are maintained in their fully hydrated state and will thus not be in a form which is injurious to plant foliage.

The nutrient slurry is then spray dried under controlled temperature conditions to form a free-flowing, dried particulate material having a volatiles content between 5 and 15 weight percent.

Spray driers appropriate for use in preparation of this product operate by atomizing the feed solution to form a spray of droplets. The droplets are mixed with hot gases to evaporate the liquid, resulting in an amorphous spray dried product. The gases and spray dried fertilizer composition are removed from the drier and the solids are separated from the gas.

Several types of atomizing nozzles will be suitable for use in preparing these dried foliar fertilizer compositions. A two-fluid nozzle will be most preferred, although a mechanical atomizer, such as a spinning disk nozzle (centrifugal atomizer) may also be used. The pressure of the feed solution through the nozzle will depend on the nozzle design and the desired droplet size. The preferred droplet size is about 25 microns, but will vary with the nozzle type, drier type and drier temperature. The selection of these parameters, and the rate of feed of the nutrient slurry through the nozzle, will be within the knowledge and ability of the process designer and will be specifically tailored for each situation to produce an amorphous, particulate spray dried material.

The gas used in the spray drier may be any gas inert to the feed solution but typically will be either air or nitrogen. Preferably, the gas is filtered (for example, through a HEPA filter) prior to delivery to the spray drier, to remove contaminants. The gas is heated to a desired temperature before being fed or injected into the drier. The temperature of the gas inside the drier is critical in order to achieve the desired product: an amorphous composition meeting product specifications for total volatiles content. The process described here will result in a product dried to a total volatiles content of about 5.0 to about 15.0 wt. %, preferably about 7.0 to about 10.0 wt. %.

The total volatiles content of the spray dried foliar fertilizer is important both for its handling and its utility. Total volatiles above the target range would signal too wet a material which would tend to harden when stored, making application, particularly as a dust, difficult or impossible. A total volatiles content below the target range would result in an unacceptable stoichiometry of the zinc and calcium components. At lower total volatiles, the calcium would form an oxide which would burn the foliage upon application. The zinc would take on the dihydrate (instead of tetrahydrate) form, which also would burn the foliage.

The internal gas temperature of the spray drier most conveniently may be adjusted with reference to the gas outlet temperature, which is easily measured. By this method, the outlet temperature is maintained within the desired operational range by means of incremental adjustments to the gas inlet temperatures. In another embodiment, the temperature may be controlled by measuring and adjusting the inlet temperature and/or mixing in a stream of colder gas as well.

The minimum outlet temperature should be about 104° to about 110° C. Temperatures below this will tend to result in a wet, clumped product. It is desired to get a free flowing product. The maximum outlet temperature should be about 115° to about 125° C., most preferably not higher than about 115° C. Temperatures above this will cause "scorching" and discoloration of the product. The most preferred gas outlet temperature range is about 105° to about 110° C. It may be desired to inject cool gas (e.g., air and/or nitrogen) at the outlet of the drier in order to prevent overheating of the product in the separation and recovery area. Maximum inlet temperature will be a function of the individual drier.

The dried product is separated from the drying gases, preferably within the drier itself, although not necessarily in the drying chamber. Separation is by conventional means. For example, internal separation based on the density differential is a suitable method. It also will be possible to conduct the product and gas to a separate collection system, as long as appropriate precautions are taken to prevent product contamination. For example, the gas and dried material may be conducted aseptically to a cyclone separator or bag house. The precise means of separation will be within the knowledge and skill of the process designer.

The dried fertilizer product may be packaged into any container which is suitable for storage and shipment. Dense packing is possible with the spray dried material of this invention. Packaging materials and design should be adequate to maintain the low moisture content of the packaged product for its anticipated shelf life.

The spray dried fertilizer product of this invention is an amorphous, free-flowing substance. The color, particle shape, and size of the spray dried material may vary widely depending on the particular nutrient components and nucleating agents used. The composition typically is in the form of randomly shaped particles with an average particle size of about 10.0 to about 25.0 microns in diameter. The particles typically are light in color (tan to off-white) with the precise color depending on the particular ingredients of which the fertilizer is comprised.

The spray dried foliar fertilizers of this invention are very effective for enhancing plant nutrition in both horticultural and agricultural applications. The foliar fertilizers of this invention comprise spray dried, homogeneous fertilizer compositions which can be applied by directly dusting the plant or tree leaves, or by dispersing in water for spray application to the leaves. The spray dried fertilizer most typically will comprise multiple components useful for enhancing plant health and nutrition.

The spray dried foliar fertilizer described herein is sufficiently versatile to be applied in both agricultural and horticultural settings. For example, the spray dried product may be applied dry, as a dusting on the leaves of young or mature plants or seedlings which are to be planted. Alternatively, the product may be mixed with water or another liquid to be applied in slurry or solution form as a spray or mist on the foliage of young or mature plants or seedlings which are to be planted. Other convenient methods of foliar application may also be used.

Applications may be at any desired rate, preferably about 5 to about 20 pounds per acre, preferably about 10 to 15 pounds per acre. Multiple application protocols may be used, with applications before and/or during the relevant growing season.

Without further elaboration, it is believed that one of ordinary skill in the art, using the preceding detailed description can utilize the present invention to its fullest extent.

The following examples are provided for illustrative purposes and are not intended to limit the invention in any way except as provided in the appended claims. The following abbreviations have been used throughout in describing the invention:

°C.—degree(s) Centigrade
ft$^2$—square foot (feet)
gm—gram(s)
gpm—gallon(s) per minute
hr—hour(s)
L—liter(s)
lb.—pound(s)
M—molar
mg—milligram(s)
ml—milliliter(s)
μ—micron(s)
%—percent
psig—pound(s) per square inch gauge
TV—total volatiles
wt.—weight All parts and percentages are by weight unless otherwise indicated.

EXAMPLE I

The following materials were added, in sequence, to a 25 gallon (95 L) stainless steel agitated hemispherical tank:

| | | |
|---|---|---|
| 33.43 lb. | (15,177.0 gm) | deionized water |
| 4.41 lb. | (2,002.0 gm) | 85% phosphoric acid |
| 3.97 lb. | (1,802.0 gm) | zinc sulfate |
| 3.84 lb. | (1,743.0 gm) | calcium hydroxide |
| 4.52 lb. | (2,052.0 gm) | mono-calcium phosphate |
| 6.00 lb. | (2,724.0 gm) | deionized water rinse. |

The materials were mixed in the tank with a standard propeller agitator for 30 minutes. The tank contents then were recirculated through a centrifugal pump at 4.0 gpm for an additional 30 minutes to break up loose agglomerates and reduce the particle size of gypsum ($CaSO_4.2H_2O$) crystals formed from zinc sulfate and calcium hydroxide. After the pumping period, the slurry was stable with a settling time of 4–5 minutes and a viscosity of 300 centipoises. The pH was 6.8. The temperature during the pumping operation was allowed to drift up to 100° F. (37°-38° C.) and was maintained there by adding a heat exchanger in the recirculating loop and controlling the outlet temperature.

The slurry was maintained with good agitation during the remainder of the processing. The slurry was pumped to a Bowen Engineering Laboratory No. BE 499 spray drier, operated in a concurrent mode. Atomization was accomplished with an air driven two-fluid nozzle run at a pressure of 30.0 psig. The feed rate of the slurry was 100 grams per minute. The spray drier was operated at an inlet hot air temperature of 470°-500° F. (243°-260° C.); the outlet temperature was 220° to 227° F. (104°-108° C.). The total volatiles (measured at 200° C.) of the spray dried material was about 8.88 wt. %. The material was free-flowing and had a particle size of approximately 20.0 microns.

A sample of this material was applied to apple trees by dusting the foliage. Approximately 10–20 lb./acre of the material were used in two pre-bloom and three post-bloom applications. The plants were studied for several months, with acceptable growth and no leaf damage reported.

EXAMPLE II

The following materials were added, in sequence, to the tank used in Example I:

| | | |
|---|---|---|
| 80.00 lb. | (36,320.0 gm) | deionized water |
| 3.74 lb. | (1,698.0 gm) | 85% phosphoric acid |
| 3.35 lb. | (1,521.0 gm) | copper sulfate mono-hydrate |
| 1.12 lb. | (508.0 gm) | monocalcium phosphate mono-hydrate |
| 2.47 lb. | (1,121.0 gm) | zinc oxide |
| 6.46 lb. | (2,933.0 gm) | gypsum |

The materials were mixed and spray dried according to the procedures of Example I. The total volatiles content of the spray dried fertilizer was 10.4 wt. %. The spray dried composition was off-white in color and was free-flowing, with particles about 20.0μ. X-ray diffraction was used to confirm that the desired stoichiometry had been obtained. This formulation was dusted on foliage to test for leaf damage; none was found to occur.

EXAMPLE III

A field test was conducted using the spray dried fertilizer of this invention. Spray dried fertilizer was prepared as in Example I. An apple orchard was treated with this spray dried fertilizer in five applications during the growing season as follows:

| Application | Rate | Stage |
|---|---|---|
| 1 | 15 lb./acre | pre-bloom |
| 2 | 10 lb./acre | pre-bloom |
| 3 | 10 lb./acre | post-bloom |
| 4 | 10 lb./acre | post-bloom |
| 5 | 10 lb./acre | post-bloom |

The spray dried fertilizer was slurried at a rate of 100 gallons per acre. Application was by standard orchard spraying (tank truck equipped with sprayer and a large fan to blow the aerosol over the trees). Trees treated in this manner exhibited excellent blooms and fruit production.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method for preparing a foliar fertilizing composition which does not burn, dehydrate or otherwise damage the foliage of plants upon direct foliage application, said method comprising (1) dispersing a mixture of nutrient compounds into an aqueous solvent to form a nutrient slurry; (2) maintaining the nutrient slurry in a dispersed state and at a temperature in the range of from 70° F. to 190° F.; (3) introducing said nutrient slurry into a spray drier; (4) maintaining the outlet temperature of the spray drier in the range of about 104° C. to 125° C.; and (5) spray drying the nutrient slurry to provide an amorphous, free-flowing, spray dried, fertilizing composition having a total volatile content between 5 and 15 weight percent, wherein said composition is maintained in a hydrated state and said mixture of nutrient compounds comprises (a) at least one calcium containing component selected from the group consisting of calcium hydroxide, calcium sulfate dihydrate, and calcium phosphate or the monohydrate thereof; (b) at least two components selected from the group consisting of phosphoric acid, zinc sulfate, zinc oxide, and copper sulfate or the monohydrate thereof; and (c) up to 5 grams per gram of total active solids on a dry weight basis a nucleating component; said components being present in the mixture in an amount effective to enhance plant nutrition and health.

2. The method of claim 1 in which the outlet temperature of the spray drier is maintained at a range of about 105° C. to about 110° C.

3. The method of claim 1 in which the nucleating compound is a nutritive ingredient selected from the group consisting of bran, chitin, corn cobs, peanut hulls or a mixture thereof.

4. The method of claim 1 in which the nucleating component is an inert ingredient selected from the group consisting of ground or particulate diatomaceous earth, activated carbon, silica, alumina, silica-alumina or a mixture thereof.

5. The method of claim 1 in which the nucleating agent is present in the mixture in an amount between 0.2 and 5 grams per gram of total active solids on a dry weight basis.

6. A method of enhancing plant nutrition and health by applying to the foliage of a plant an effective fertilizing amount of a fertilizing composition produced by the process of claim 1.

7. The method of claim 6 in which the fertilizing composition is applied by dusting on said plant foliage.

8. The method of claim 6 in which the fertilizing composition is applied to the plant foliage in an aqueous solution or suspension.

9. The method of claim 6 in which said fertilizing composition is applied to the foliage in an amount in the range of about 15 to about 20 pounds per acre.

10. A fertilizing composition produced by the process of claim 1.

11. The method of claim 1 wherein the nutrient slurry is maintained at a temperature between 90° F. and 150° F.

12. The method of claim 1 wherein the nutrient slurry is maintained at a temperature of 100° F.

13. The method of claim 1 wherein the volatiles content of the spray dried nutrient slurry is between 7 and 10 weight percent.

14. The method of claim 1 wherein a particulate nucleating agent is added to the nutrient slurry in an amount between 2 and 10 percent of the slurry.

* * * * *